(12) United States Patent
Lewis et al.

(10) Patent No.: US 11,727,815 B2
(45) Date of Patent: Aug. 15, 2023

(54) METHODS AND SYSTEMS FOR REGENERATING AT LEAST A PORTION OF A FLIGHT PLAN BASED ON LOCATION-SPECIFIC DATA

(71) Applicant: Honeywell International Inc., Charlotte, NC (US)

(72) Inventors: Daniel E. Lewis, Charlotte, NC (US); John Suddreth, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 319 days.

(21) Appl. No.: 17/225,914

(22) Filed: Apr. 8, 2021

(65) Prior Publication Data

US 2022/0327942 A1    Oct. 13, 2022

(51) Int. Cl.
*G08G 5/00* (2006.01)
*G01C 21/00* (2006.01)
*B64D 43/02* (2006.01)

(52) U.S. Cl.
CPC ......... *G08G 5/0043* (2013.01); *G01C 21/005* (2013.01); *B64D 43/02* (2013.01)

(58) Field of Classification Search
CPC .... G05D 1/106; G05D 1/0214; G05D 1/1064; G08G 5/003; G08G 5/004; G08G 5/0043; G08G 5/0069; G08G 5/04; G08G 5/0039; G08G 5/0021; G08G 5/0082; G08G 5/0086; G08G 5/0078; G08G 5/045; G08G 5/0013; G08G 5/0026; B64C 2201/127; B64C 39/024; B64C 2201/146; B64C 2201/027; B64C 2201/12; B64C 2201/14; B64C 2201/141; H04L 67/125; H04L 67/18; H04L 67/22; G01C 21/005; B64D 43/02

See application file for complete search history.

(56) References Cited

U.S. PATENT DOCUMENTS

| | | | |
|---|---|---|---|
| 10,710,740 B1* | 7/2020 | Tchon | G01C 23/00 |
| 2015/0254986 A1* | 9/2015 | Fairfield | G05D 1/0088 |
| | | | 707/687 |
| 2019/0272762 A1* | 9/2019 | Suddreth | G08G 5/0021 |
| 2021/0233413 A1* | 7/2021 | Holloway | G08G 5/0052 |
| 2022/0057214 A1* | 2/2022 | O'Dell | G08G 5/0039 |

* cited by examiner

*Primary Examiner* — Abby Y Lin
*Assistant Examiner* — Dylan M Katz
(74) *Attorney, Agent, or Firm* — Bookoff McAndrews, PLLC

(57) ABSTRACT

Disclosed are methods, systems, and a non-transitory computer-readable medium for regenerating at least a portion of a flight plan of a vehicle. The method may include generating an adjustment to a speed, an altitude, and/or a heading for one or more locations along a flight path within at least one of a predetermined distance of the vehicle and a predetermined window of time, based on received speed data, altitude data, and flight path data, including a subset of points along each boom footprint included in the flight path data, and a permissible threshold boom value for each of the one or more locations. The method may also include regenerating a portion of a flight plan corresponding to the one or more locations, based on the generated adjustment to the speed, altitude, and/or heading for the one or more locations.

20 Claims, 10 Drawing Sheets

METHODS AND SYSTEMS FOR REGENERATING AT LEAST A PORTION OF A FLIGHT PLAN BASED ON LOCATION-SPECIFIC DATA

TECHNICAL FIELD

Various embodiments of the present disclosure relate generally to methods and systems for regenerating at least a portion of a flight plan of a vehicle based on location-specific data and a permissible threshold boom value.

BACKGROUND

Supersonic vehicles, for example, supersonic aircraft, generate a sonic boom when traveling faster than the speed of sound. Factors that influence a strength of a sonic boom include the weight, size, and shape of the vehicle, in addition to the altitude, speed, and flight path of the vehicle, as well as weather and atmospheric conditions. For example, the higher the altitude of the vehicle, the greater the distance the shock waves must travel to reach the ground, which, in turn, reduces an intensity of the sonic boom. The sonic boom forms a boom "carpet" on the ground having a maximum intensity directly beneath the vehicle, if terrain beneath the vehicle is generally flat, or at a closest point to vehicle along terrain beneath vehicle, if terrain beneath the vehicle is not flat, and decreasing as a lateral distance from the flight path increases. Lateral spread of the sonic boom depends upon the altitude and speed of the aircraft, as well as the atmosphere. Maneuvers, such as pushovers, acceleration, or "S" turns, of the vehicle may amplify the intensity of the sonic boom. In addition, geographic features of the ground, such as hills, valleys, and mountains, can reflect shock waves of the sonic boom, which may increase the intensity of the sonic boom.

The shock waves from the sonic booms can cause damage, such as compromised structural stability and shattered glass, to structures that lie within the boom carpet, and generate noise disturbances in areas within the boom carpet. Further, the shock waves from the sonic booms can affect wildlife, startling and alarming animals and causing other short-term and long-term detrimental effects, including, for example, weight reductions, hearing loss, reductions in milk product of dairy cows and goats, decreased appetite in brown shrimp, etc. Therefore, certification authorities, such as the United States Federal Aviation Administration (FAA), prohibit or restrict operation of a civil aircraft at a true flight Mach number greater than 1 over land in the United States, and from a certain distance off shore when a sonic boom could reach U.S. shores. As the FAA considers a range of permissible supersonic operations, however, there is a need to consider how to account for restrictions relating to permissible sonic boom values during operation of the vehicle.

For example, systems and/or operators of supersonic vehicles may need to adjust flight plans to accommodate restrictions, such as minimum, or floor, requirements that dictate a minimum altitude that a vehicle may cruise at supersonic speed, or maximum Mach speed requirements (based on altitude) for a geographic region through which the vehicle is to travel. More specifically, altitudes, speeds, headings, and timings and locations for maneuvers, such as climbs, descents, accelerations, or decelerations, may require adjustment to minimize sonic booms generated by these maneuvers. This is particularly true if a change occurs at one or more upcoming locations along a flight path, such as a change in weather or wind conditions, which could affect the boom values along the boom carpet as the vehicle performs such maneuvers. When such a change occurs, there is a need to quickly and efficiently regenerate at least a portion of the flight to ensure boom values generated by the maneuvers do not exceed threshold boom values. There is also a need to perform such regeneration quickly, at least as to an upcoming distance of, for example, 25 to 50 miles of the flight path, to avoid delay caused by sending data off board to a flight management system on the ground and receiving results of an off board communication, and to prevent failure of any such regeneration in the event that communications with the flight management system on the ground fail.

The present disclosure is directed to addressing one or more of these above-referenced needs.

SUMMARY OF THE DISCLOSURE

According to certain aspects of the disclosure, methods and systems are disclosed for regeneration of at least a portion of a flight plan of a vehicle.

For instance, a method of regenerating at least a portion of a flight plan of a vehicle may include receiving, by one or more processors of a navigation system of the vehicle, speed data, altitude data, and flight path data for a flight path of the vehicle. The flight path data includes boom footprints for one or more locations along the flight path, and each boom footprint includes a plurality of points. The method may also include generating, using the one or more processors of the navigation system of the vehicle, an adjustment to at least one of a speed, an altitude, and a heading for one or more locations along the flight path within at least one of a predetermined distance of the vehicle and a predetermined window of time, based on at least the received speed data, altitude data, and flight path data, including a first subset of the plurality of points of each boom footprint, and a permissible threshold boom value for each of the one or more locations. In addition, the method may include regenerating, using the one or more processors of the navigation system of the vehicle, a portion of a flight plan corresponding to the one or more locations, based on the generated adjustment to the at least one of the speed, the altitude, and the heading for the one or more locations.

A system for regenerating at least a portion of a flight plan of a vehicle may include a memory storing instructions, and a processor executing the instructions to perform a method. The method may include receiving, by one or more processors of a navigation system of the vehicle, speed data, altitude data, and flight path data for a flight path of the vehicle. The flight path data includes boom footprints for one or more locations along the flight path, and each boom footprint includes a plurality of points. The method may also include generating, using the one or more processors of the navigation system of the vehicle, an adjustment to at least one of a speed, an altitude, and a heading for one or more locations along the flight path within at least one of a predetermined distance of the vehicle and a predetermined window of time, based on at least the received speed data, altitude data, and flight path data, including a first subset of the plurality of points of each boom footprint, and a permissible threshold boom value for each of the one or more locations. In addition, the method may include regenerating, using the one or more processors of the navigation system of the vehicle, a portion of a flight plan corresponding to the one or more locations, based on the generated adjustment to the at least one of the speed, the altitude, and the heading for the one or more locations.

A non-transitory computer-readable medium may store instructions that, when executed by one or more processors, cause the one or more processors to perform a method. The method may include receiving, by one or more processors of a navigation system of the vehicle, speed data, altitude data, and flight path data for a flight path of the vehicle. The flight path data includes boom footprints for one or more locations along the flight path, and each boom footprint includes a plurality of points. The method may also include generating, using the one or more processors of the navigation system of the vehicle, an adjustment to at least one of a speed, an altitude, and a heading for one or more locations along the flight path within at least one of a predetermined distance of the vehicle and a predetermined window of time, based on at least the received speed data, altitude data, and flight path data, including a first subset of the plurality of points of each boom footprint, and a permissible threshold boom value for each of the one or more locations. In addition, the method may include regenerating, using the one or more processors of the navigation system of the vehicle, a portion of a flight plan corresponding to the one or more locations, based on the generated adjustment to the at least one of the speed, the altitude, and the heading for the one or more locations.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

In general, the present disclosure is directed to methods and systems for regenerating at least a portion of a flight plan of a vehicle. For instance, a method of the present disclosure may include receiving speed data, altitude data, and flight path data for a flight path of the vehicle. The flight path data may include, for example, boom footprints for one or more locations along the flight path, with each boom footprint including a plurality of points. The method may also include generating, using one or more processors of a navigation system of the vehicle, an adjustment to at least one of a speed, an altitude, and a heading for one or more locations along the flight path within at least one of a predetermined distance of the vehicle and a predetermined window of time. The generation of the adjustment is based on at least the received speed data, altitude data, and flight path data, including a first subset of the plurality of points of each boom footprint, and a permissible threshold boom value for each of the one or more locations. In addition, the method may include regenerating, using the one or more processors of the navigation system of the vehicle, a portion of a flight plan corresponding to the one or more locations, based on the generated adjustment to the at least one of the speed, the altitude, and the heading for the one or more locations.

By virtue of the methods and the related systems disclosed herein, adjustments to altitudes, speeds, headings, and timings and locations for maneuvers may be quickly generated and implemented, via an on-board control system, for at least a portion of a flight path, in order to minimize sonic booms generated by such maneuvers, particularly where a change may occur at an upcoming location along the flight path.

Figure 1:
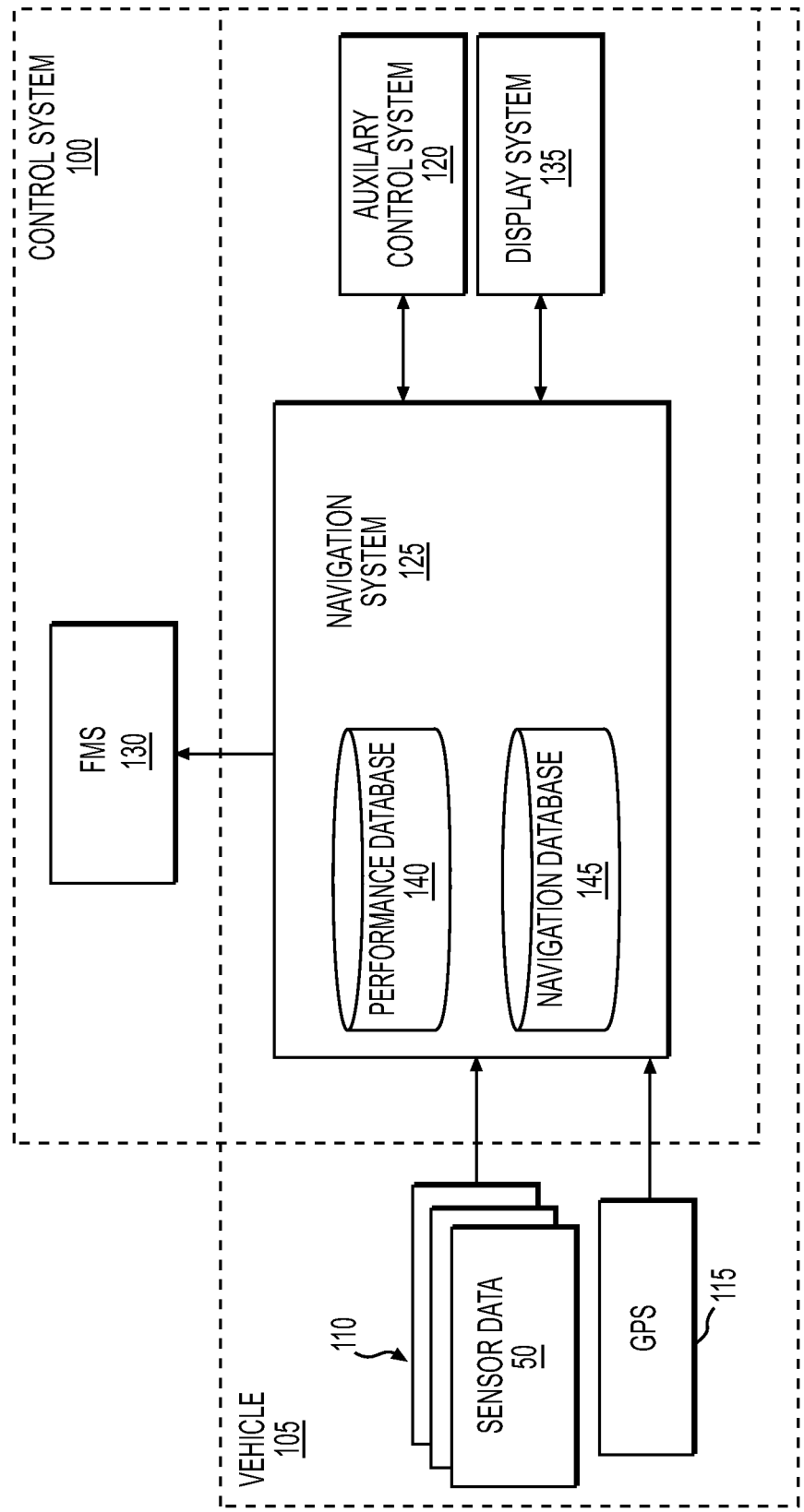
FIG. 1 depicts an exemplary block diagram of a system for regenerating at least a portion of a flight plan of a vehicle, according to one or more embodiments.

FIG. 1 depicts an exemplary block diagram of a control system 100 for regenerating at least a portion of a flight plan of a vehicle 105, according to one or more embodiments. The vehicle 105 may be a supersonic aircraft, although the vehicle 105 is not so limited, and may also be a supersonic drone (e.g., an unmanned aircraft), a rocket, a spacecraft, or any other vehicle capable of traveling at supersonic speed. The vehicle 105 may include portions of the control system 100, while other portions of the control system 100 may be off-board of the vehicle 105. The vehicle 105 may also be equipped with one or more sensors 110, including, for example, a speed sensor, an altitude sensor, and a heading sensor (e.g., a compass), described in more detail below. The vehicle 105 may include a Global Positioning System (GPS) antenna 115. The control system 100 may include an auxiliary control system 120, such as a control system used in controlling aspects of a cabin of the vehicle, such as entertainment systems, a navigation system 125 and a flight management system (FMS) 130, and a display system 135 (or, generally, a user interface system). At least the navigation system 125 and the auxiliary control system 120 may be installed within a cockpit of the vehicle 105, for example. As noted, however, other portions of the control system 100, such as the FMS 130, may be off-board of the vehicle 105, but in communication with the navigation system 125.

The auxiliary control system 120 may be any on-board system having the capacity (e.g., having spare CPU cycles) to perform calculations to validate or check the calculations of, for example, the navigation system 125, as discussed in more detail below.

The FMS 130 may store a flight plan 200, including a planned flight path 205 (shown in FIGS. 2-4), of the vehicle 105, and may manage the flight plan 200 of the vehicle 105 based on inputs, such as user or system inputs, including inputs from the sensors 110 and inputs from the GPS 115, to thereby control the vehicle 105 as it progresses along the flight plan 200. The FMS 130 may continuously perform calculations along the planned flight path 205, as the vehicle 105 proceeds along or near to the planned flight path 205. In performing these calculations, the FMS 130 may account for a required time of arrival (RTA) of the vehicle 105 to a destination, restricted airspace, weather or atmospheric conditions, air traffic from other aircraft, limitations to ensure passenger comfort, etc. And, with respect to some of the data accounted for by the FMS 130, the FMS 130 may continually (e.g., periodically) update the planned flight path 205 based on this data, such as data relating to weather or atmospheric conditions. The FMS 130 may also update the planned flight path 205 based on changes in data, e.g., changes in the weather or atmospheric conditions, during a flight. In addition, the FMS 130 may use performance data of the vehicle, described in more detail below, to determine locations, times, and amounts for transitions, such as acceleration or deceleration, along the planned flight path 205. And, the FMS 130, as part of the control system 120, may control the vehicle 105 as it proceeds along the planned flight path 205.

Figure 2:
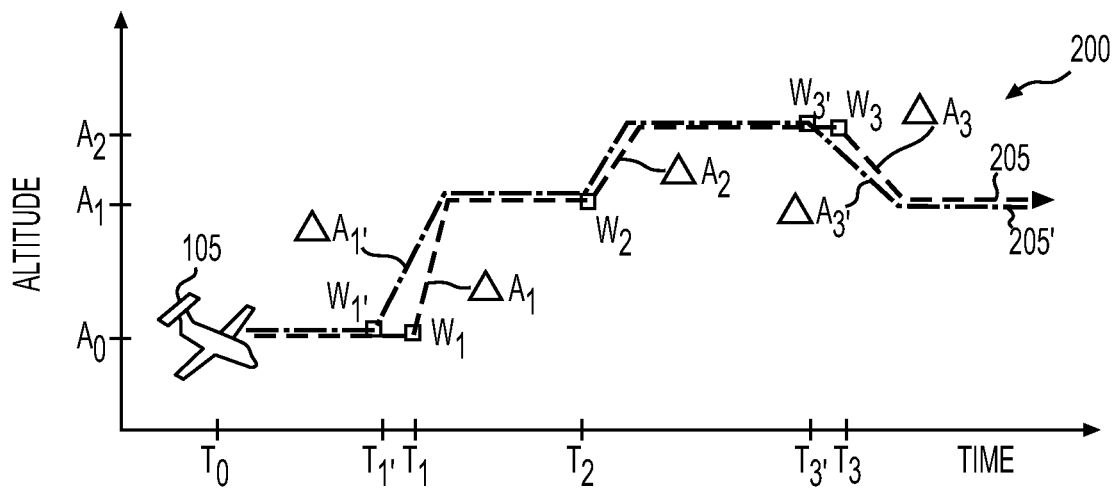
FIG. 2 depicts a graph of time against amplitude for an exemplary planned flight path, as well as generated adjusted altitudes, according to one or more embodiments.

As depicted in FIG. 2, for example, the flight plan 200 may include altitudes for the planned flight path 205 between various points (e.g., waypoints, such as waypoints $W_1$ to $W_3$, at times $T_1$ to $T_3$, respectively, shown in FIG. 2). As shown in FIG. 2, the flight plan 200 may indicate that at waypoints $W_1$ and $W_2$, the vehicle 105 is to change altitude by climbing (or ascending), and at waypoint $W_3$, the vehicle 105 is to change altitude by descending. Climbing and descending are examples of transitions, with waypoints $W_1$, $W_2$, and $W_3$ being referred to herein as "transition locations." Notably, however, the flight plan 200 may indicate a transition at a different point, other than a named waypoint, such as before or after one of waypoints $W_1$, $W_2$, or $W_3$.

Figure 3:
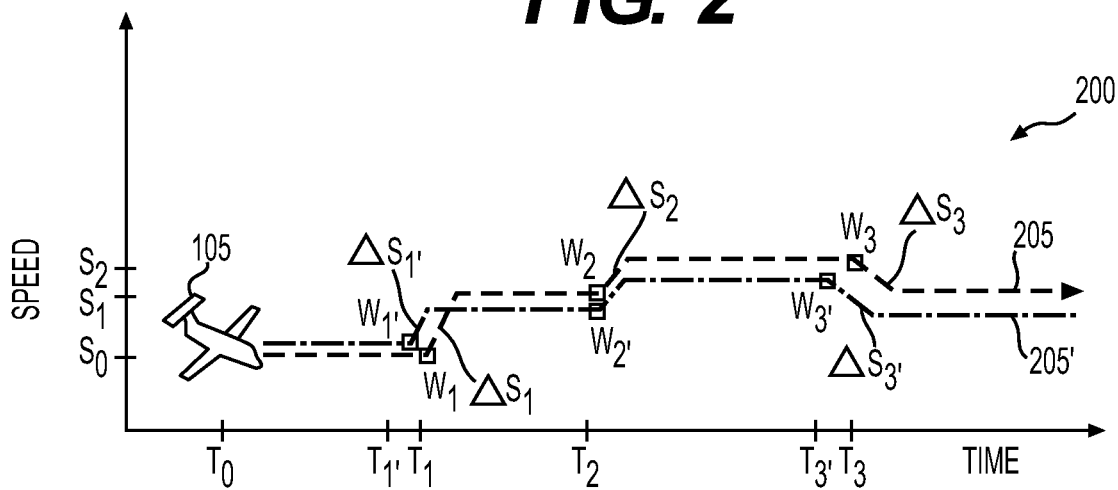
FIG. 3 depicts a graph of time against speed for an exemplary planned flight path, as well as generated adjusted speeds, according to one or more embodiments.

As depicted in FIG. 3, the flight plan 200 may also include speeds for the planned flight path 205 between various waypoints (e.g., waypoints, such as waypoints $W_1$ to $W_3$, at times $T_1$ to $T_3$, respectively, shown in FIG. 3). The flight plan 200 may also indicate that at waypoints $W_1$ and $W_2$, the vehicle 105 is to change speed by accelerating, and at waypoint $W_3$, the vehicle 105 is to change speed by decelerating, for example. Accelerating and decelerating are examples of transitions, with waypoints $W_1$, $W_2$, and $W_3$ being referenced to herein as "transition locations," and the change in speed and the change in altitude being "transition amounts." A transition amount may comprise a change in speed $\Delta S$, a change in altitude $\Delta A$, or both. The transitions may result in transition of the vehicle 105 from supersonic to subsonic flight, or vice versa. Flight plans may indicate transitions based on various criteria, such as RTA, restricted airspace, air traffic from other aircraft, efficient use of fuel, weather conditions, etc. Furthermore, the flight plan 200 may be updated before and/or during a flight of the vehicle 105, such as by an operator, e.g., a pilot, or based on user or system inputs to the FMS 130.

The navigation system 125 includes a performance database 140 that stores performance data of the vehicle 105, described in more detail below, and a navigation database 145 that stores the flight plan 200. The navigation system 125 may control navigation of the vehicle 105, based at least in part on the flight plan 200 and calculations performed by the FMS 130, to control the vehicle 105 along the flight path 200, including along maneuvers and through transition points. Examples of maneuvers include climbs, descents, accelerations, decelerations, which are described above as transitions, as well as turns, including, for example, banked turns or "s" turns. A plurality of maneuvers may be programmed into the FMS 130 or the navigation system 125, and stored, for example, in the navigation database 145. The plurality of maneuvers may be designed based on circumstances (e.g., starting altitude, cruising altitude, ending altitude, geographic conditions, weather conditions, etc.) for the route through which the vehicle 105 is to travel, and may further be designed based on specific characteristics of the vehicle 105 (e.g., characteristics of all vehicles of a type similar or same as the vehicle 105, including center of gravity (CG), weight, etc.). The plurality of maneuvers may be included as part of the flight plan 200 (e.g., takeoff, climb, cruise, turns, accelerate, decelerate, descend, landing, etc.). Generally, the plurality of maneuvers may be flight path curves that indicate an altitude and/or a speed, with respect to time, and one or more waypoints of the vehicle 105 through a maneuver. The plurality of maneuvers may be stored in the performance database 140, e.g., with identifiers.

The navigation system 125, in conjunction with the FMS 130, controls actuation systems of the vehicle 105, which may include motors, engines, and/or propellers to generate thrust, lift, and/or directional force for the vehicle 105, and flaps or other control surfaces to augment the thrust, lift, and/or directional force for the vehicle 105, to carry out the plurality of maneuvers of the flight plan 200. The navigation system 125 may collect sensor data 50 from various sensors 110 installed on the vehicle 105, GPS data from the GPS 115, and navigation and performance-related data from external systems connected to the navigation system 125 via a wired and/or a wireless connection. The navigation system 125 may also collect data from the FMS 130, including data received from other vehicles passing through waypoints along the planned flight path 205. The received data may be stored in one or more databases of the navigation system 125, such as the performance database 140 and the navigation database 145, depending on the type of data. For example, in a case in which the vehicle 105 is an aircraft, aerodynamic and engine performance models of the aircraft, maximum take-off weight, fuel weight, and distribution models, CG models and CG thresholds, drag models, and other data relating to the particular aircraft may be stored in the performance database 140. The aerodynamic and engine performance models may include a flight envelope for maneuvers of the vehicle 105, and a prediction model. The information stored in the performance database 140 may be used to predict performance of the vehicle in a maneuver, such as the automated descent maneuver or the automated deceleration maneuver noted above, and, more specifically, to predict a boom value that will be generated when the vehicle 105 performs such a maneuver.

The navigation database 145 may store information related to navigation or routing of the vehicle 105 in a geographic area. In particular, the navigation database 145 may contain data elements that indicate restrictions on maneuvers, such as supersonic flight restrictions. The supersonic flight restrictions may indicate three-dimensional zones in which supersonic flight is not allowed, or is allowed but in a limited manner. More specifically, the supersonic flight restrictions may include permissible threshold boom values for waypoints along the planned flight path 205, as well as for locations near the waypoints of the planned flight path 205, and locations along a boom footprint for the waypoints of the planned flight path 205. The permissible threshold boom values indicate, for example, maximum boom values for particular waypoints and/or for the locations along the boom footprints. The information stored in the navigation database 145 may also include, for example, the waypoints, airports, runways, airways, radio navigation aids, holding patterns, etc.

Figure 4:
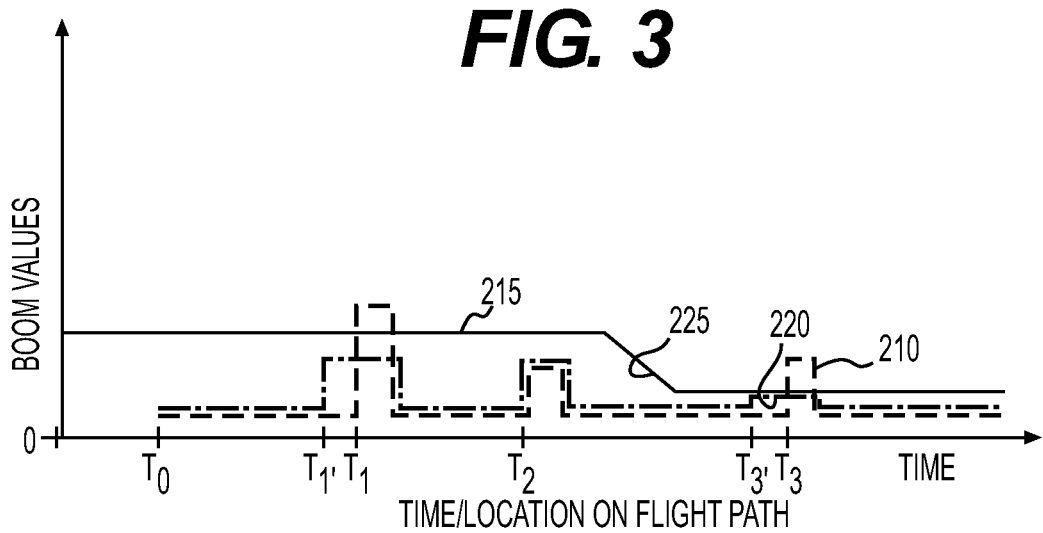
FIG. 4 depicts a graph of time and location against boom values for the exemplary planned flight path, including boom values for adjusted altitudes, according to one or more embodiments.

FIG. 4 shows a graph of times and locations along a flight path 200 against boom values, including predicted boom values 210, permissible boom values 215, and adjusted boom values 220, along the planned flight path 205. The predicted boom values 210 represent boom values determined based on data relating to the flight plan 200 (e.g., starting altitude, cruising altitude, ending altitude), data relating to the route through which the vehicle 105 is to travel (e.g., geographic conditions, environment conditions, etc.), and data relating to characteristics of the vehicle 105 (e.g., characteristics of all vehicles of a type similar or same as the vehicle 105, including center of gravity (CG), weight, etc.). The predicted boom values 210 may be generated as part of the flight plan 200. The permissible boom values 215 represent boom values set by a certification authority, such as the FAA, and may be based on altitudes, speeds, geography, and environment data for locations along the flight path 205. Changes in the permissible boom values 215, such as the change 225 shown in FIG. 4, may be based on a change in geography of land below the flight path 205, a change in environment data, or a change in the flight path 205, such as a change in altitude, speed, and/or waypoint in the flight path 205. The adjusted boom values 220 represent boom values determined based on the method 700, described below, and may, for example, reflect a change in least one of a location, a time, and an amount for transitions of the vehicle to ensure boom values from such transitions do not exceed permissible boom values.

Figure 5:
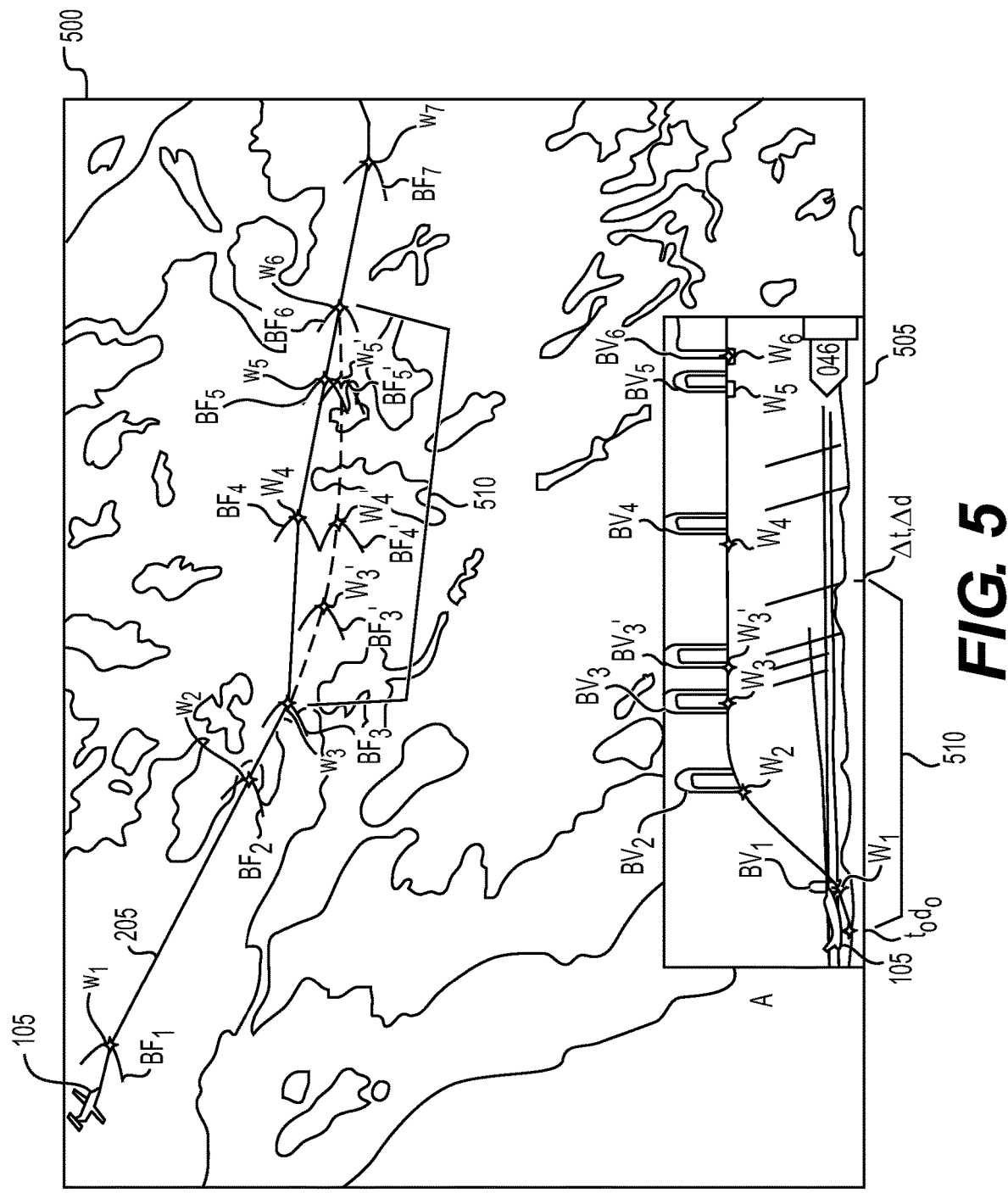
FIG. 5 depicts an exemplary display of a planned flight path, including a regenerated portion of the flight path, and boom values for waypoints, as viewed by an operator of a vehicle, according to one or more embodiments.
Figure 6:
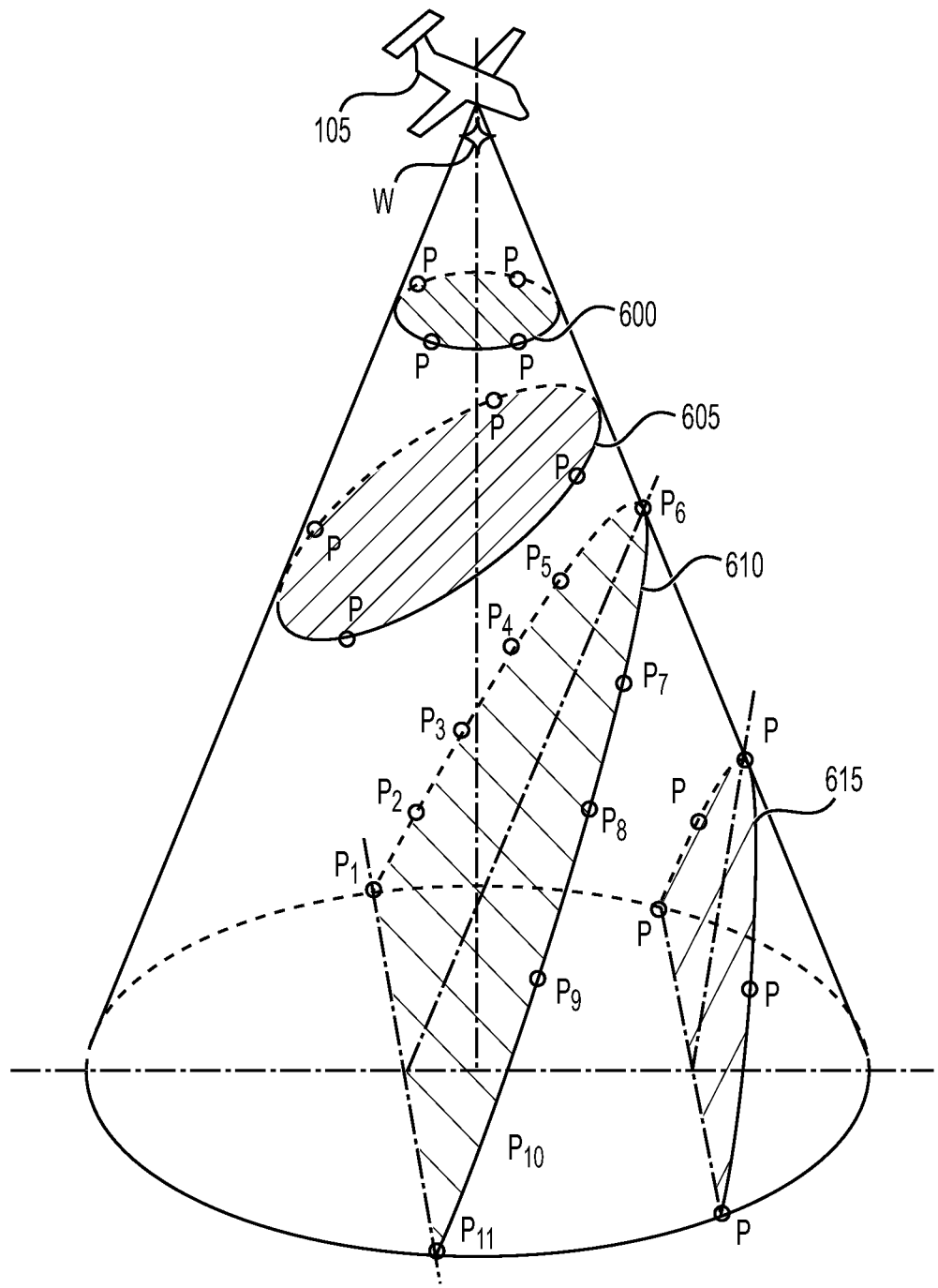
FIG. 6 depicts exemplary boom footprints, including a plurality of points, included in flight path data of a vehicle, according to one or more embodiments.

FIG. 5 shows an exemplary display of the planned flight path 205 of the vehicle 105, including boom footprints for waypoints along the planned flight path 205 (e.g., boom footprints $BF_1$-$BF_7$ for waypoints $W_1$-$W_7$, respectively). FIG. 5 also includes an inset 505, including a graph depicting altitudes of the vehicle 105 against time t and distance d along the planned flight path 205, as well as boom values generated at the waypoints along the planned flight path 205 (e.g., boom values $BV_1$-$BV_6$ for waypoints $W_1$-$W_6$, respectively). As discussed in more detail below, FIG. 5 also shows a regenerated portion 510 of the flight path 205, including a boom value for at least one adjusted waypoint (e.g., boom value $BV_3'$ for adjusted waypoint $W_3'$), as viewed by an operator of a vehicle, according to one or more embodiments. FIG. 6 shows exemplary boom footprints BF for a waypoint W, including a plurality of points P along the boom footprints BF. As shown in FIG. 6, the shape of a boom footprint generated by a vehicle 105 may be a shape within a plane or a section of a cone beneath the vehicle 105, and, more specifically, may be roughly represented by one of a circle 600, an ellipse 605, a parabola 610, or a hyperbola 615. Each boom footprint may also have, therefore, a width, which may be defined as a radius of the circle 600 or the ellipse 605, or a distance between intercept points of the ends of the parabola 610 or the hyperbola 615 with the terrain. The vehicle 105 is at the point of the cone, as shown, and the shaded areas are representative of "flat terrain", or planar terrain, though it is understood that terrain may have variations in height that would correspondingly alter the shape of the boom footprint. The boom footprint of a given instantaneous boom of a vehicle 105 performing a climb, a descent, or cruising, would be a parabola 610 or a hyperbola 615. In the description of the methods below, parabola 610 is used in describing a boom footprint having points $P_1$ to $P_{11}$, though points along a boom footprint of any of the shapes shown in FIG. 6 may be used in the methods.

Figure 7:
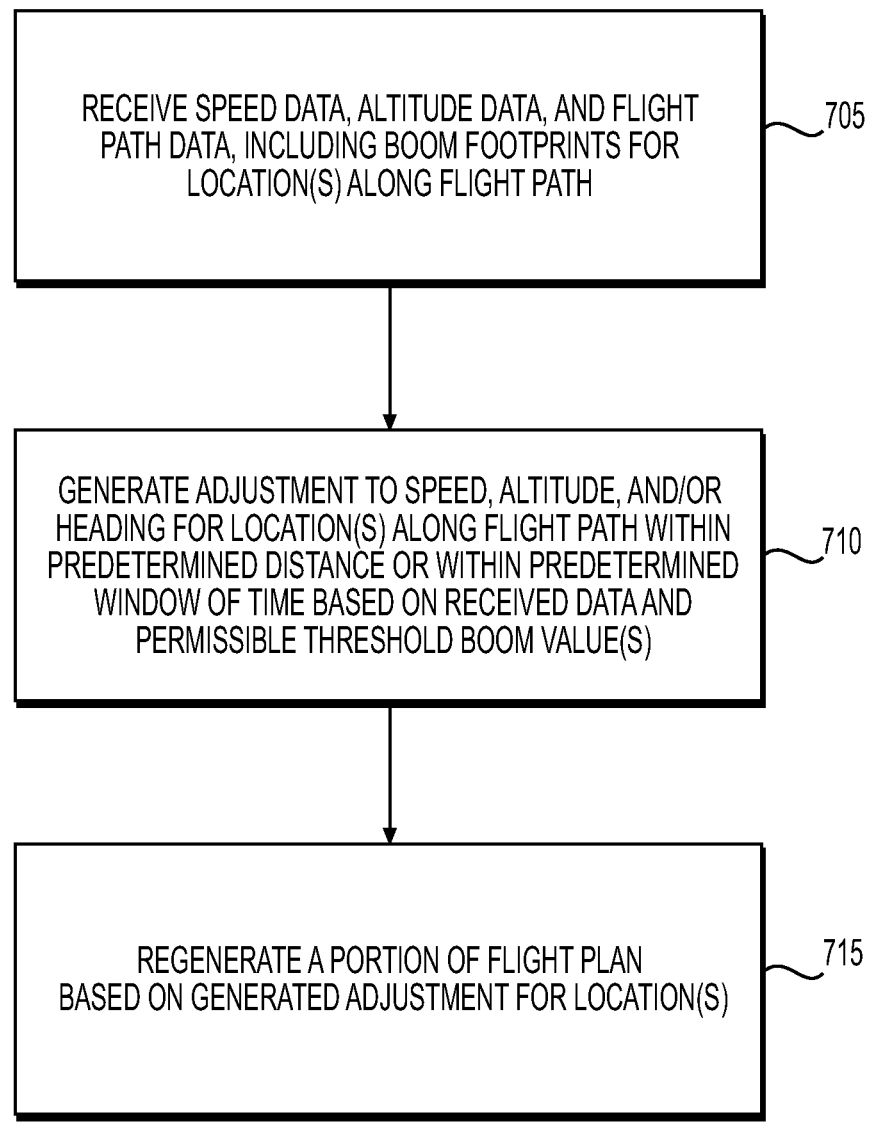
FIG. 7 shows a flowchart for a method of regenerating at least a portion of a flight plan of a vehicle, according to one or more embodiments.

With reference to FIG. 7, in one aspect of the disclosure, the control system 100, and, in particular, the navigation system 125, may perform a process 700 of regenerating a portion of a flight plan based on speed data, altitude data, and flight path data, including boom footprints for locations along a flight path. The process 700 may include a step 705 of receiving speed data, altitude data, and flight path data for a flight path 205 of the vehicle 105. The flight path data includes boom footprints BF for locations or waypoints W along the flight path 205, with each boom footprint BF including a plurality of points. Then, in step 710, the received speed data, altitude data, and flight path data are processed to generate at least one of an adjustment to at least one of a speed, an altitude, and a heading (or direction) for one or more of the locations or waypoints W along the flight path 205. The generation of the adjustment may be limited to one or more locations or waypoints W along the fight path 205 that are within a predetermined distance Δd or within a predetermined window of time Δt relative to a current position do of the vehicle and a current time to, as shown, for example, in the inset 505 in FIG. 5. The generation of the adjustment is based on at least the received speed data, altitude data, and flight path data, including a number of the plurality of points of each boom footprint BF. For example, a number of the total points of the boom footprint BF shown in FIG. 6 may be used in step 710, such as points $P_1$-$P_{11}$. In addition, the generation of the adjustment is based on a permissible threshold boom value for each of the locations or waypoints W. The method 700 also includes a step 715 of regenerating a portion of the flight plan 200 corresponding to the one or more locations, based on the generated adjustment.

To obtain the speed data and the altitude data, the navigation system 125 may continually or periodically request and receive the sensor data 50 from the one or more sensors 110, which are connected to other systems of the vehicle 105. For instance, the navigation system 125 may receive speed data from a speed sensor, and altitude data from an altitude sensor.

To obtain flight path data, including the boom footprints BF for the waypoints W along the flight path 205 of the vehicle 105, the navigation system 125 may request a copy of the flight plan 200, or at least a portion thereof, from the FMS 130. The flight path data includes, for example, altitudes, speeds, headings, and a boom footprint BF, including a plurality of points, for a plurality of waypoints W along the planned flight path 205. In the process 700 described above, the navigation system 125 may request a speed, an altitude, and a heading for each waypoint W within the predetermined distance Δd from the current location do of the vehicle 105, or within the predetermined window of time Δt relative to the current time to. In addition, the navigation system 125 may receive updates to the flight plan 200 and other data, as described in more detail below, from the FMS 130 during the flight.

The navigation system 125 may determine the distance of the vehicle 105 relative to a given waypoint W, and the time until the vehicle 105 reaches the waypoint W based on monitoring of progress of the vehicle 105 through the flight plan 200, such as by extracting position data (e.g., GPS data, heading data, track data, etc.) from the sensor data 50, and comparing the position data to points of the planned flight path 205. For instance, the navigation system 125 may determine the position data indicates the vehicle 105 is a distance d away (or a time t away) from a given waypoint W on the planned flight path 205.

In performing processing of received speed data, altitude data, and flight path data to generate an adjustment to at least one of a speed, an altitude, and a heading for a given waypoint W along the flight path 205, during the process 700, the navigation system 125 executes an algorithm, which may be stored in a memory of the control system 100, shown in FIG. 12, and described below. The algorithm may include performance calculations used to determine performance characteristics, such as determining a thrust-to-weight ratio, a drag force, a timing or duration of the flight based on data relating to the vehicle 105 and environmental data, such as air temperature, air density, etc. The algorithm also includes a sonic boom algorithm, which calculates a boom value for each of a plurality of points along a boom footprint of a given waypoint along the planned flight path 205 using performance tables for the vehicle 105. The performance tables are stored in the performance database 140, and include data such as engine and aerodynamic performance data, as well as thrust, lift, drag, climb, and fuel burn (or fuel consumption) data for the vehicle 105. The sonic boom algorithm uses the received speed data, altitude data, and flight path data, performance tables for the vehicle 105, stored in the performance database 135, and performance measurements of the vehicle 105, in calculating the boom value for each of the plurality of points along the boom footprint of the waypoint W. In particular, the boom value for each point along a boom footprint of a waypoint is calculated using, for example, the Cockpit Interactive Sonic Boom Display Avionics (CISBoomDa) algorithm developed by the National Aeronautics and Space Administration (NASA).

The navigation system 125 then compares the calculated boom value to a permissible threshold boom value for the location corresponding to each of the plurality of points along the boom footprint of the waypoint. If each calculated boom value is less than or equal to a corresponding permissible threshold boom value, for example, the navigation system 125 proceeds along the planned flight path 205. If any of the calculated boom values for a plurality of points along a boom footprint of a waypoint exceed a corresponding permissible threshold boom value, however, the navigation system 125 generates an adjustment to at least one of a speed, an altitude, and a heading for one or more locations along the flight path. In particular, the navigation system 125 generates an adjustment to a speed using a change in speed calculated by the FMS 130. Alternatively or in addition, the navigation system 125 generates an adjustment to an altitude using a change in altitude calculated by the FMS 130. Alternatively or in addition, the navigation system 125 generates an adjustment to a heading using a change in heading calculated by the FMS 130. In generating each of the above-noted adjustments, the navigation system 125 may use permissible threshold boom values for locations that are at a distance of, for example, 2 miles, from the waypoint or from the vehicle in any one of a lateral direction, a forward direction, or a rearward direction, to determine the adjusted speed, altitude, or heading, respectively.

Then, the navigation system 125 may regenerate the portion of the flight plan 200, using the adjustment to the speed, the altitude, and/or the heading for the one or more locations along the flight path 205. The one or more locations may include the waypoint for which a boom value exceeds a permissible threshold value, in addition to locations before or after the waypoint, such as the location 2 miles from the waypoint. Alternatively, the one or more locations may not include the waypoint. The regenerated portion of the flight plan may then be used in controlling the vehicle 105.

In addition or alternatively, the generation of an adjustment to a speed, an altitude, or a heading may be done ad hoc, and/or on an iterative basis. Further, the generation of an adjustment to a speed, an altitude, or a heading may be done based on analysis of terrain near the flight path 205. For example, the navigation system 125 may determine or identify lower terrain (that is, terrain with a lower elevation relative to sea level, as compared to terrain along the flight path 205), such as valleys, and/or terrain for which the lower elevation extends to a width that is greater than a width of a boom footprint in generating an adjustment to a heading. In other words, the navigation system 125 may analyze terrain near the flight path 205 to identify relatively lower terrain having a relatively wide expanse and generate the adjustment to the heading upon identifying such an area. If the navigation system 125 cannot, however, identify such an area, the navigation system 125 may generate an adjustment to the speed and/or an adjustment to the altitude, as an alternative to the adjustment to the heading. Then, upon regeneration of the portion of the flight plan 200, the navigation system 125 may determine if boom values for waypoints along the regenerated portion of the flight plan 200 are less than permissible threshold boom values for those waypoints. If the navigation system 125 identifies an acceptable boom value at a waypoint, the navigation system 125 may repeat or iterate this process until the regenerated portion of the flight plan 200 contains waypoints for which all boom values are less than permissible threshold boom values. By virtue of this process, one or more candidate regenerated flight plans could be processed again for verification of permissible boom values, thereby generating a down select or a refinement of the regenerated flight plan.

Generation of the adjustment to the speed, the altitude, and/or the headings for the one or more locations may further be based on environment data specific to the one or more locations. The environment data may, for example, include data received from the FMS 130, which may, in turn, receive the environment data specific to the one or more locations from other vehicles that have passed through those respective locations within a predetermined amount of time relative to a time at which the vehicle 105 is expected to pass through that location. For example, if another vehicle has passed through a location within 15 minutes of a time when the vehicle 105 is expected to pass through that location, environment data, such as temperature, barometric pressure, wind speed, etc., detected by sensors of the other vehicle, is transmitted to the FMS 130, and then to the navigation system 125 on board the vehicle 105, so that the navigation system 125 can use the environment data in generating the adjustment to the speed, the altitude, and/or the headings for the location. Because boom values depend in part on such environment data, the calculation of boom values further incorporates the environment data using the CISBoomDa algorithm noted above.

For example, with reference to FIGS. 2 and 3, the navigation system 125 receives a current speed $S_0$ and a current altitude $A_0$ of the vehicle 105, as well as the flight path data including speeds $S_1$ and $S_2$, altitudes $A_1$, and $A_2$, and corresponding times for waypoints $W_1$-$W_3$ along the planned flight path 205. The navigation system 125 may also receive the environment data, as noted above. In addition, with reference to FIG. 5, the navigation system 125 receives at least boom footprints $BF_1$-$BF_3$ for waypoints $W_1$-$W_3$ along the flight path 205. Each boom footprint BF is approximately in the shape of a parabola, and includes a plurality of points $P_n$, such as points $P_1$-$P_{11}$ along the boom footprint 610, shown in FIG. 6. Using this data and the CISBoomDa algorithm, for example, as noted above, the navigation system 125 calculates boom values for the plurality of points $P_n$ for each boom footprint $BF_1$-$BF_3$ using the CISBoomDa algorithm, for example. The navigation system 125 then determines whether the calculated boom values are permissible by comparing the calculated boom values to permissible threshold values. Considering, for example, a boom value at a center of the boom footprint $BF_3$ for waypoint $W_3$, the navigation system 125 may determine that the calculated boom value exceeds a permissible threshold boom value, as shown in FIG. 4. The navigation system 125 then generates an adjustment to at least one of the altitude, the speed, or the heading of one or more locations along the flight path 205, using the process noted above. In the example shown in FIGS. 2-4, the navigation system 125 may generate an adjusted altitude, reflecting a change in altitude $\Delta A_3'$, at a location $W_3'$ and a time $t_3'$, using the process noted above. In addition or alternatively, the navigation system 125 may generate an adjusted speed, reflecting a change in speed $\Delta S_3'$, at the location $W_3'$ and the time $t_3'$, using the process noted above. The location $W_3'$ may, for example, be a location that is two miles before the waypoint $W_3$ included as part of the original flight plan 200. The navigation system 125 then regenerates a portion of the flight plan 200 including the adjusted altitude or speed at waypoint $W_3'$, in order to control the vehicle 105 along the regenerated portion of the flight plan 200. The location $W_3'$ and the time $t_3'$, shown in FIGS. 2-4, constitute portions of an adjusted flight path 205', which is included in the regenerated portion of the flight plan 200. The navigation system 125 may then perform the steps of calculating boom values, using the CISBoomDa algorithm, for example, for waypoints along the regenerated portion of the flight plan 200, and determining whether the calculated boom values are permissible by comparing the calculated boom values to permissible threshold values. For example, as shown in FIG. 4, by virtue of the adjusted altitude or the adjusted speed of the regenerated portion of the flight plan 200, the boom value for the location $W_3'$ at time $t_3'$ falls below a permissible threshold boom value for that location. By performing this iterative process, it is possible to ensure that the vehicle 105 will not generate a sonic boom that exceeds a permissible threshold at any of the locations along the flight path 205 of the initial flight plan 200 or the flight path 205' of a regenerated portion of a flight plan 200.

By virtue of the navigation system 125 performing the steps of the method 700 described above, it is possible to adjust a flight plan of the vehicle to accommodate restrictions relating to sonic booms, as well as changes, such as changes in weather or wind conditions, which could affect boom values along a boom carpet for upcoming locations along a flight path of the vehicle. By generating adjustments and regenerating a portion of the flight plan on-board the vehicle, the flight plan can be quickly and efficiently updated to ensure the vehicle, in performing maneuvers and proceeding along the flight path, does not generate a sonic boom that exceeds a permissible threshold boom value at an upcoming location along the flight path. And, by performing the steps of the method 700 on-board the vehicle 125, using, for example, the navigation system 125, it is possible to eliminate delays or failures in communication with an off-board control system, such as the FMS 130.

Figure 8:
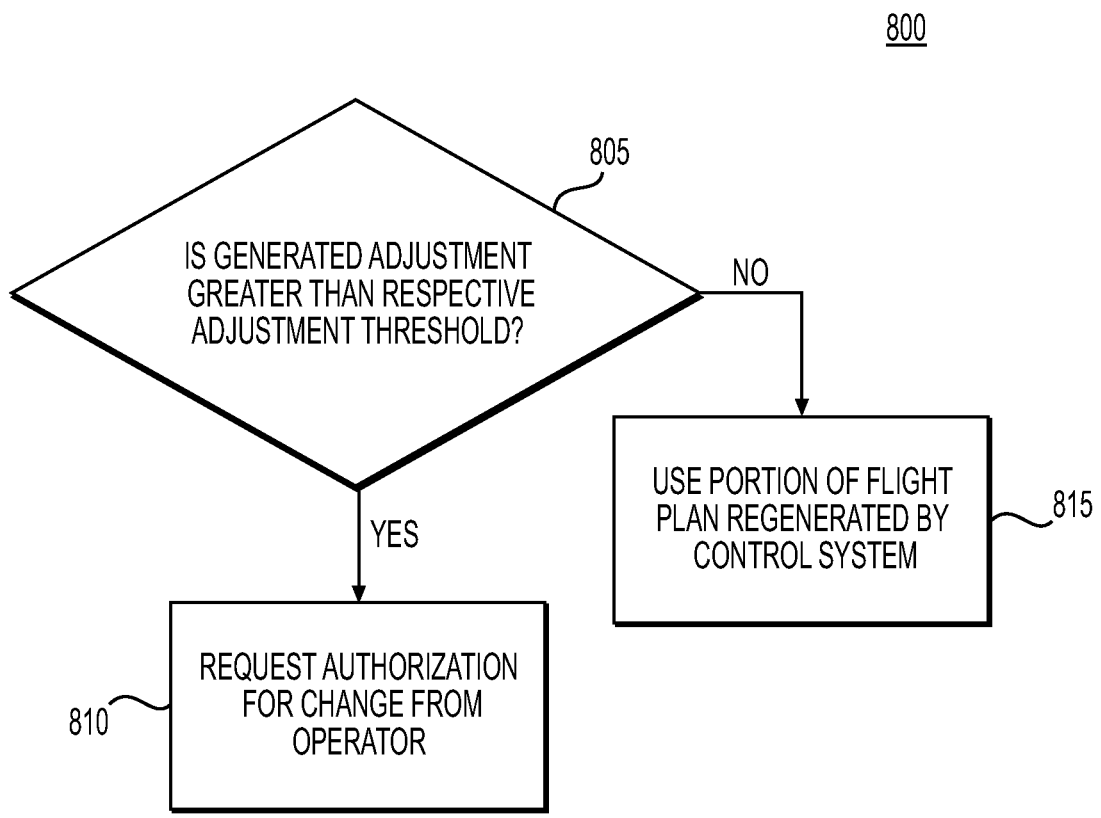
FIG. 8 shows a flowchart for an additional step of the method shown in FIG. 7, including requesting authorization for a change in the portion of the flight plan, according to one or more embodiments.

With reference to FIG. 8, in another aspect of the disclosure, the navigation system 125 may perform the additional steps shown in the method 800. In particular, the navigation system 125 may determine in step 805 whether the generated adjustment is greater than a respective adjustment threshold. For example, the navigation system 125 may compare the generated adjustment to an altitude to a stored altitude adjustment threshold value. If the generated adjustment is greater than the adjustment threshold (yes in step 805), in step 810, the navigation system 125 may generate a request for authorization for a change in altitude, based on the adjusted altitude, to an operator of the vehicle 105. The request may be displayed on a display 1100 shown in FIG. 11, as part of the display system 135. The display 1100 may be configured to receive a selection from an operator, such as "YES," indicating authorization of the change, or "NO," declining authorization of the change. The selection may then be transmitted back to the navigation system 125 for additional processing, such as generation of alternative adjustments to the flight plan. For example, if the operator declines authorization of a change in altitude or heading, the navigation system 125 may repeat the steps 805 and 810, to propose a change of speed, in order to avoid generating a sonic boom that exceeds permissible threshold boom values. If, however, the generated adjustment is not greater than the adjustment threshold (no in step 805), in step 815, the navigation system 125 may proceed with using the regenerated portion of the flight plan, without requesting authorization from the operator. The steps of the method 800 may be performed after step 715, in which the portion of the flight plan 200 is regenerated. By virtue of the method 800 described above, the operator can be made aware of and can approve relatively large changes in altitude, speed, or heading, eliminating any confusion or surprise on the part of the operator when such adjustments to the flight plan are generated.

Figure 9:
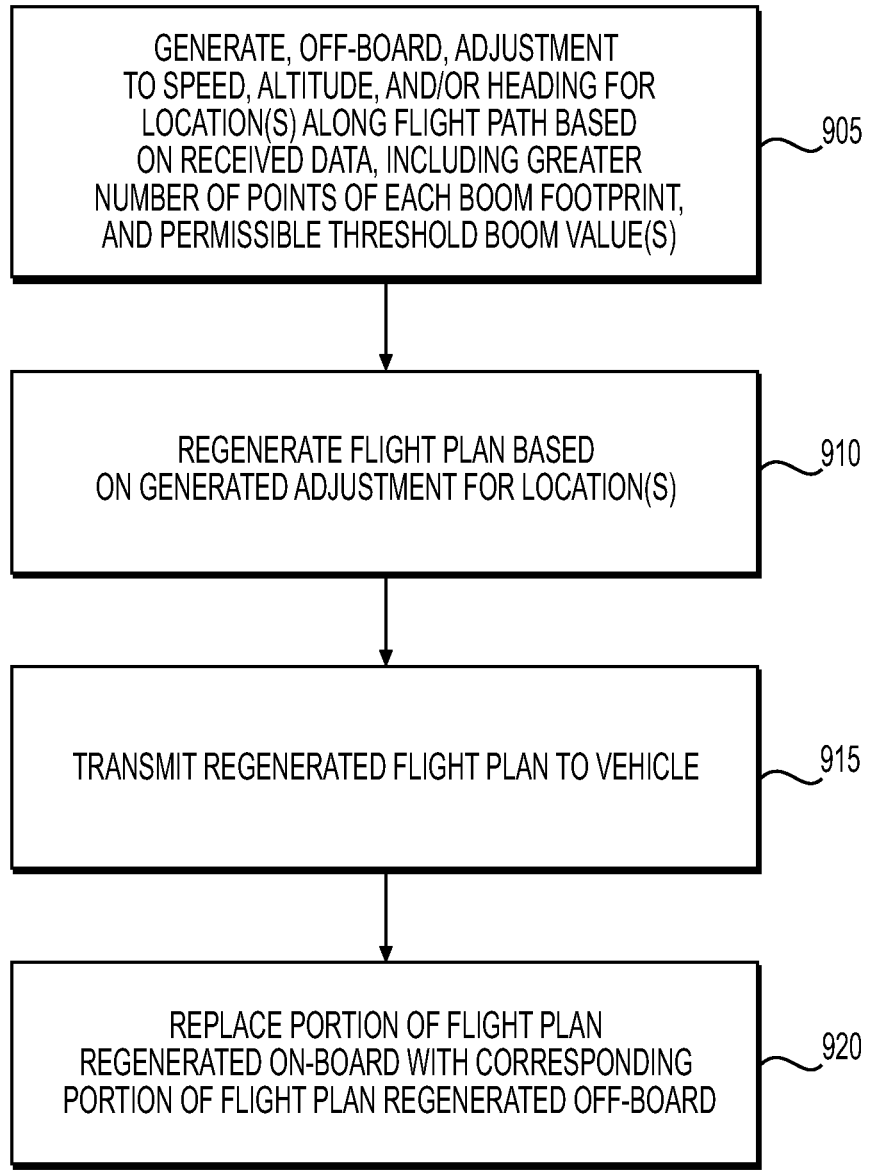
FIG. 9 shows a flowchart for additional steps of the method shown in FIG. 7, including steps performed using an off-board control system, according to one or more embodiments.

With reference to FIG. 9, in another aspect of the disclosure, an off-board portion of the control system 100, such as the FMS 130, may perform the additional steps shown in the method 900. In particular, in step 905, the FMS 130 generates an adjustment to a speed, an altitude, and/or a heading for one or more locations along the flight path 205, based on received speed data, altitude data, and flight path data. The FMS 130 receives real-time data regarding at least a speed, an altitude, and a heading of the vehicle 105 via the navigation system 125. The FMS 130 may also receive additional data, such as environment data for upcoming locations along the flight path 205, from other vehicles having passed through those locations within a predetermined window of time, e.g., 15 minutes. The FMS 130 may generate such an adjustment using the same process used by the navigation system 125, noted above with respect to method 700.

The FMS 130, however, may use a greater number of points along each boom footprint BF, as compared to the number of points used by the navigation system 125, to generate the adjusted speed, altitude, and/or heading. For example, the FMS 130 may use 50 or more points along each boom footprint BF, whereas the navigation system 125 may use 10 points along each boom footprint BF. The number of points along each boom footprint BF and used by the FMS 130 and the navigation system 125, respectively, are not limited to these numbers, and may be greater or lesser than these numbers, provided the FMS 130 uses a greater number of points than the navigation system 125.

Then, in step 910, the FMS 130 regenerates the remainder of the flight plan 200 based on the generated adjustment. That is, the FMS 130 incorporates the adjusted speed, altitude, and/or heading for the one or more locations in regenerating the flight plan 200. The FMS 130 then transmits the regenerated flight plan 200 to the vehicle 105 in step 915. In addition, in step 920, the navigation system 125 replaces at least the portion of the flight plan regenerated by the navigation system 125 with the corresponding portion of the flight plan regenerated by the FMS 130. By virtue of the method 900, calculated adjustments performed off-board, such as by the FMS 130, using a greater number of data points along the boom footprints for each waypoint, and, therefore, having increased accuracy, can be used in controlling the vehicle 105 along the remainder of the flight plan 200.

Figure 10:
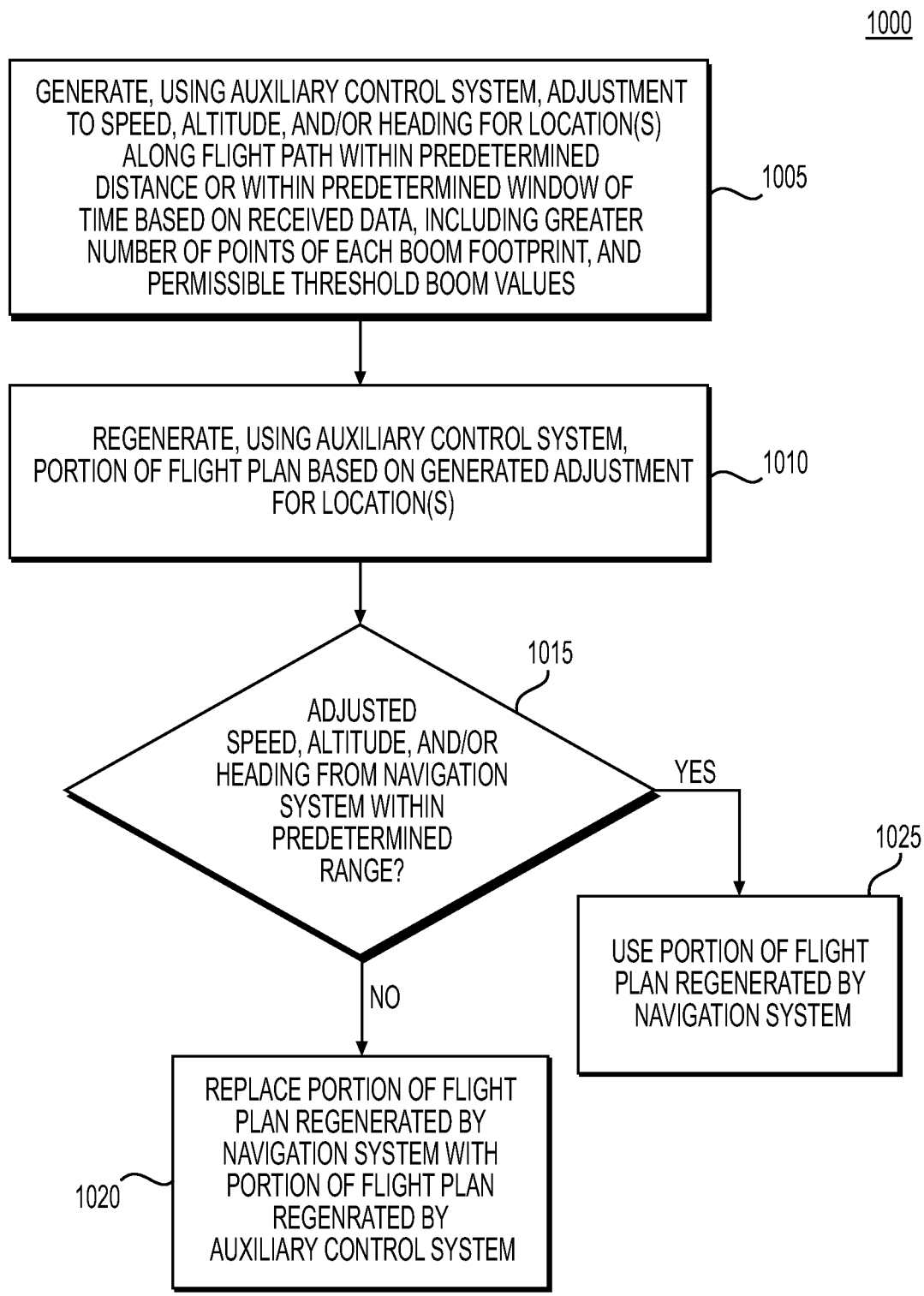
FIG. 10 shows a flowchart for additional steps of the method shown in FIG. 7, including steps performed using an auxiliary control system, according to one or more embodiments.

With reference to FIG. 10, in another aspect of the invention, the auxiliary control system 120 and the navigation system 125 may perform the additional steps shown in the method 1000. In particular, the auxiliary control system 120 generates, in step 1005, an adjustment to at least one of the speed, the altitude, and the heading for the one or more locations along the flight path 205, based on at least the received speed data, altitude data, and flight path data, including the number of the plurality of points for each boom footprint, and the permissible threshold boom value for each of the one or more locations. The auxiliary control system 120 may use the same algorithms and processes noted above with respect to step 710 of the method 700, in generating the adjusted speed, altitude, and/or heading. Then, in step 1010, the auxiliary control system 120 regenerates the portion of the flight plan 200 based on the generated adjusted speed, altitude, and/or heading, similarly to the step 715 of the method 700 noted above. The method 1000 may also include a step 1015 of determining, using the navigation system 125, whether the adjusted speed, altitude, or heading of the portion of the flight plan 200 regenerated by the navigation system 125 is within a predetermined speed range, a predetermined altitude range, or a predetermined heading range, respectively of the adjusted speed, altitude, or heading of the portion of the flight plan 200 regenerated by the auxiliary control system 120. If the adjusted speed, altitude, or heading of the portion of the flight plan 200 regenerated by the navigation system 125 is not within the predetermined speed range, the predetermined altitude range, or the predetermined heading range, respectively, (no in step 1015), the navigation system 125 replaces, in step 1020, the portion of the flight plan 200 regenerated by the navigation system 125 with a corresponding portion of the regenerated flight plan 200 generated by the auxiliary control system 120. If, however, the adjusted speed, altitude, or heading of the portion of the flight plan 200 regenerated by the navigation system 125 is within the predetermined speed range, the predetermined altitude range, or the predetermined heading range, respectively, the navigation system 125 may proceed with using the portion of the flight plan 200 regenerated by the navigation system 125 to control the vehicle 105 along the remainder of the flight plan 200. By virtue of the steps of the method 1000 described above, the adjustments generated by the navigation system 125 can be checked using another on-board system, here, the auxiliary control system 120, in order to ensure that the generated adjustments, and the resulting regenerated portion of the flight plan 200, are within expected ranges for such adjustments. Further, by using another on-board system to perform this check, the possibility of delayed or interrupted transmission of such back-up calculations is eliminated.

The methods 700, 800, 900, and 1000 described above may be performed continually, periodically, or upon receiving a request from an operator of the vehicle 105, for example. And the methods 700, 800, 900, and 1000 may be performed more than once for one or more waypoints within a predetermined distance of a current location of the vehicle 105, or through which the vehicle 105 will pass in a predetermined window of time. In addition, the methods 700, 800, 900, and 1000 may be performed for waypoints further along the planned flight path 205, as the vehicle 105 progresses along the planned flight path 205. Further, the methods 700, 800, 900, and 1000 may be performed upon transmission of information from FMS 130 indicating a change in environment data at one or more waypoints along the planned flight path 205. Still further, at least the method 900, in which the remainder of the flight plan is regenerated off-board of the vehicle 105, may be performed if an amount of a change at an upcoming location along the flight path 205 exceeds a threshold change amount (e.g., if a wind speed changes by more than 15 knots), or if a number of changes at an upcoming location exceeds a predetermined number (e.g., if temperature, barometric pressure, wind speed, and precipitation conditions change, amounting to four changes, are detected and communicated to the vehicle 105 via the FMS 130). In addition, some or all of the methods 700, 800, 900, and 1000 may be performed together or simultaneously, in that steps may be performed on-board of the vehicle 105, using the navigation system 125 and/or the auxiliary control system 120, while other steps may be simultaneously performed off-board of the vehicle 105, using the FMS 130.

Figure 11:
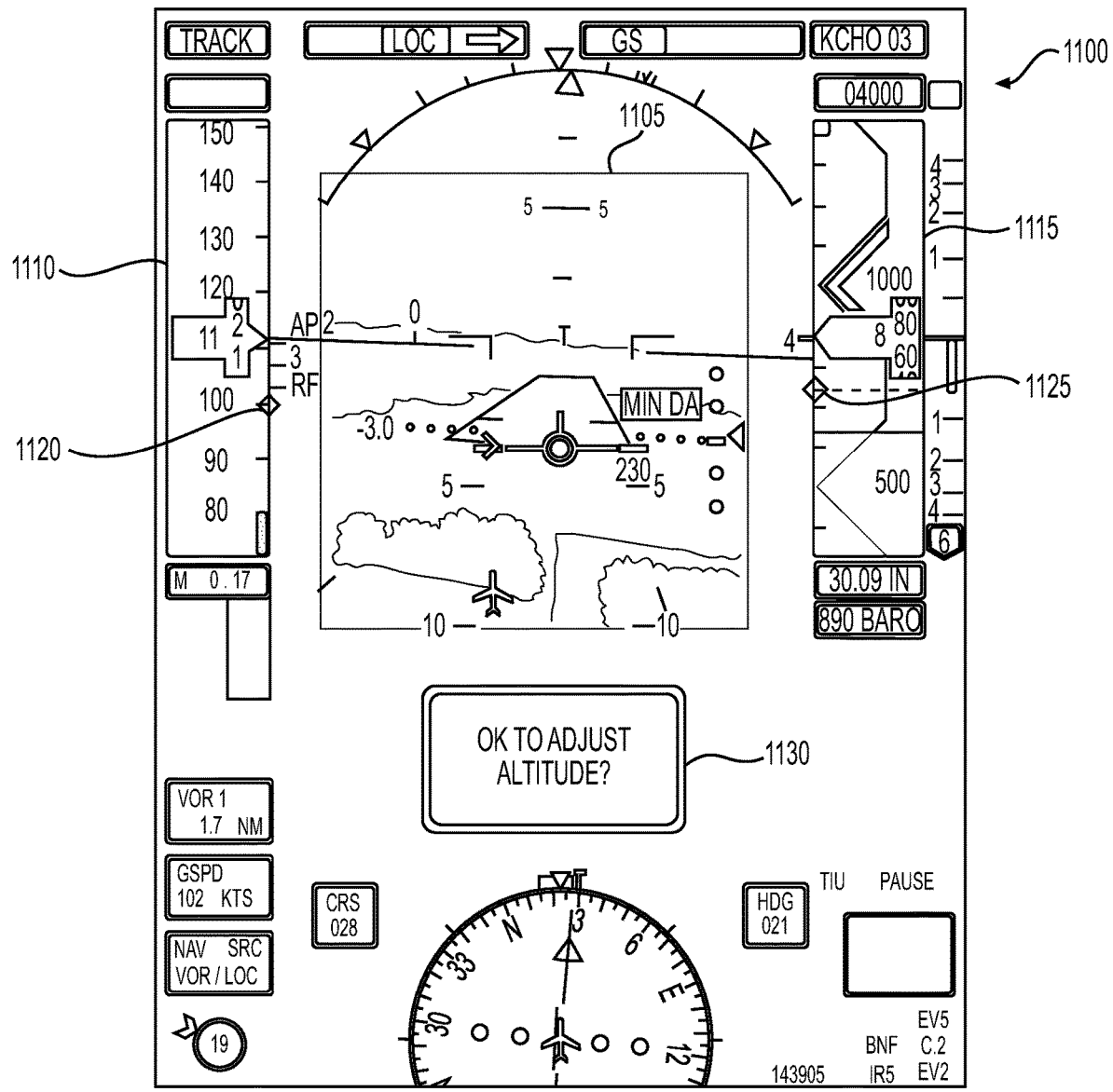
FIG. 11 depicts an example display, including a request for authorization for a change in the portion of the flight plan, as viewed by an operator of a vehicle, according to one or more embodiments.

FIG. 11 depicts an example display as viewed by an operator of a vehicle, according to one or more embodiments. More specifically, FIG. 11 shows a display 1100, including a projected forward view 1105 of the flight path 205 of the vehicle 105, and an airspeed tape 1110 and an altitude tape 1115 along the sides of the projected forward view 1105. The airspeed tape 1110 shows a current speed of the vehicle 105, based on inputs from a speed sensor, and the altitude tape 1115 shows a current altitude of the vehicle 105, based on inputs from an altitude sensor of the vehicle 105. The airspeed tape 1110 may show, for example, an adjusted speed indicator 1120, which indicates an adjusted speed, as determined according to one of the methods described above. Alternatively or in addition, the altitude tape 1115 may show, for example, an adjusted altitude indicator 1125, which indicates the adjusted altitude, as determined according to one of the methods described above. The display 1100 may also include a request 1130, in the form of a pop-up window overlaid on or near the forward view 1105, requesting approval for the adjusted altitude or speed, for example, from the operator.

Figure 12:
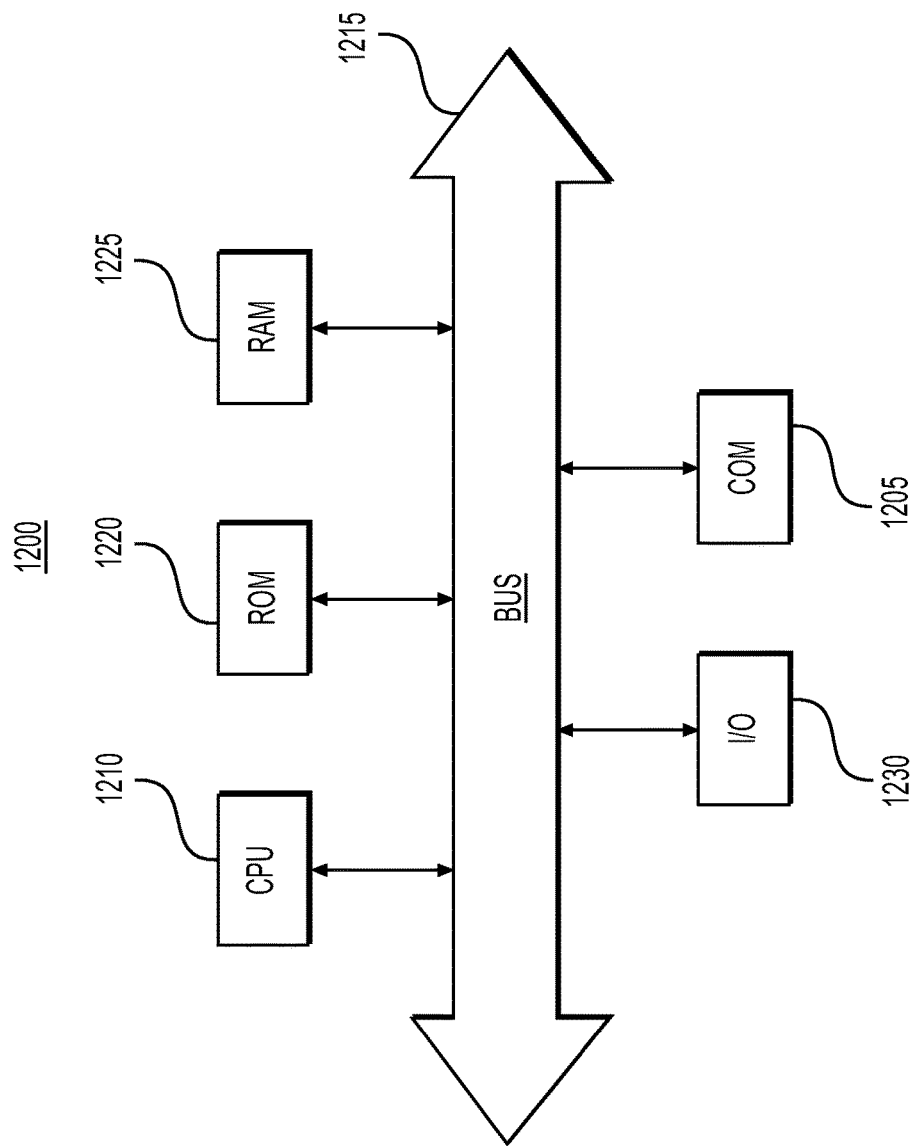
FIG. 12 depicts an example system that may execute techniques presented herein.

FIG. 12 depicts an example system 1200, such as the navigation system 125, for example, that may execute techniques presented herein. FIG. 12 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1205 for packet data communication. The platform may also include a central processing unit ("CPU") 1210, in the form of one or more processors, for executing program instructions. The platform may include an internal communication bus 1215, and the platform may also include a program storage and/or a data storage for various data files to be processed and/or communicated by the platform, such as a read only memory (ROM) 1220 and a random access memory (RAM) 1225, although the system 1200 may receive programming and data via network communications. The system 1200 also may include input and output (I/O) ports 1230 to connect with input and output devices, such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of regenerating at least a portion of a flight plan of a vehicle, the method comprising:
   receiving, by one or more processors of a first system, speed data, altitude data, and flight path data for a flight path of the vehicle, the first system comprising a navigation system of the vehicle, the flight path data including boom footprints for one or more locations along the flight path, each boom footprint including a plurality of points;
   generating, using the one or more processors of the navigation system of the vehicle, a first adjustment to at least one of a speed, an altitude, and a heading for one or more locations along the flight path within at least one of a predetermined distance of the vehicle and a predetermined window of time, based on at least the received speed data, altitude data, and flight path data, including a first subset of the plurality of points of each boom footprint, and a permissible threshold boom value for each of the one or more locations;
   regenerating, using the one or more processors of the navigation system of the vehicle, a portion of a flight plan corresponding to the one or more locations, based on the generated first adjustment to the at least one of the speed, the altitude, and the heading for the one or more locations;
   generating, using one or more processors of a second system, a second adjustment to at least one of the speed, the altitude, and the heading for one or more locations along the flight path;
   regenerating, using the one or more processors of the second system, a portion of the flight plan corresponding to the one or more locations, based on the generated second adjustment to the at least one of the speed, the altitude, and the heading for the one or more locations; and
   transmitting the regenerated flight plan generated by the second system to the navigation system of the vehicle as a command that controls the vehicle.

2. The method of claim 1, wherein the generating the first adjustment to the at least one of the speed, the altitude, and the heading for the one or more locations is further based on environment data specific to the one or more locations.

3. The method of claim 2, wherein the environment data specific to the one or more locations is received from one or more vehicles having passed through the one or more locations, respectively, within another predetermined window of time.

4. The method of claim 1, further comprising:
   determining whether the generated first adjustment to the at least one of the speed, the altitude, and the heading for the one or more locations along the flight path is greater than a respective adjustment threshold; and
   requesting authorization for at least one of a change in speed, a change in altitude, and a change in heading of the vehicle from an operator of the vehicle upon determining that the generated first adjustment to the at least one of the speed, the altitude, and the heading for the one or more locations along the flight path is greater than a respective adjustment threshold.

5. The method of claim 1, wherein:
   the second system is an off-board control system in communication with the navigation system of the vehicle; and
   the generating the second adjustment to at least one of the speed, the altitude, and the heading for the one or more locations along the flight path, is based on at least the received speed data, altitude data, and flight path data, including a second subset of the plurality of points for each boom footprint, and the permissible threshold boom value for each of the one or more locations, the second subset of the plurality of points being greater in number than the first subset of the plurality of points.

6. The method of claim 5, further comprising:
   replacing the portion of the flight plan regenerated by the navigation system of the vehicle with a corresponding portion of the regenerated flight plan generated by the off-board control system.

7. The method of claim 1, wherein:
   the second system is an auxiliary control system of the vehicle;
   the generating the second adjustment to the at least one of the speed, the altitude, and the heading for the one or more locations along the flight path, is based on at least the received speed data, altitude data, and flight path data, including the first subset of the plurality of points for each boom footprint, and the permissible threshold boom value for each of the one or more locations; and
   further comprising:
   determining, using the one or more processors of the navigation system of the vehicle, whether the first adjusted speed, altitude, or heading of the portion of the flight plan regenerated by the one or more processors of the navigation system of the vehicle is within a predetermined speed range, a predetermined altitude range, or a predetermined heading range, respectively of the second adjusted speed, altitude, or heading of the portion of the flight plan regenerated by the one or more processors of the auxiliary control system.

8. The method of claim 7, further comprising replacing, upon determining that the first adjusted speed, altitude, or heading of the portion of the flight plan regenerated by the one or more processors of the navigation system is not within the predetermined speed range, the predetermined altitude range, or the predetermined heading range, respectively, the portion of the flight plan regenerated by the one or more processors of the navigation system of the vehicle with the portion of the flight plan regenerated by the auxiliary control system.

9. A system for regenerating at least a portion of a flight plan of a vehicle, the system comprising:
   a memory storing instructions; and
   a processor executing the instructions to perform a method including:
   receiving, by one or more processors of a first system, speed data, altitude data, and flight path data for a flight path of the vehicle, the first system comprising a navigation system of the vehicle, the flight path data including boom footprints for one or more locations along the flight path, each boom footprint including a plurality of points;
   generating, using the one or more processors of the navigation system of the vehicle, a first adjustment to at least one of a speed, an altitude, and a heading for one or more locations along the flight path within at least one of a predetermined distance of the vehicle and a predetermined window of time, based on at least the received speed data, altitude data, and flight path data, including a first subset of the plurality of points of each boom footprint, and a permissible threshold boom value for each of the one or more locations;

regenerating, using the one or more processors of the navigation system of the vehicle, a portion of a flight plan corresponding to the one or more locations, based on the generated first adjustment to the at least one of the speed, the altitude, and the heading for the one or more locations generating, using one or more processors of a second system, a second adjustment to at least one of the speed, the altitude, and the heading for one or more locations along the flight path;

regenerating, using the one or more processors of the second system, a portion of the flight plan corresponding to the one or more locations, based on the generated second adjustment to the at least one of the speed, the altitude, and the heading for the one or more locations; and transmitting the regenerated flight plan generated by the second system to the navigation system of the vehicle as a command that controls the vehicle.

10. The system of claim 9, wherein the generating the first adjustment to the at least one of the speed, the altitude, and the heading for the one or more locations is further based on environment data specific to the one or more locations.

11. The system of claim 10, wherein the environment data specific to the one or more locations is received from one or more vehicles having passed through the one or more locations, respectively, within another predetermined window of time.

12. The system of claim 9, wherein the method further includes:

determining whether the generated first adjustment to the at least one of the speed, the altitude, and the heading for the one or more locations along the flight path is greater than a respective adjustment threshold; and requesting authorization for at least one of a change in speed, a change in altitude, and a change in heading of the vehicle from an operator of the vehicle upon determining that the generated first adjustment to the at least one of the speed, the altitude, and the heading for the one or more locations along the flight path is greater than a respective adjustment threshold.

13. The system of claim 9, wherein the second system is an off-board control system in communication with the navigation system of the vehicle; and the generating, the second adjustment to at least one of the speed, the altitude, and the heading for the one or more locations along the flight path, is based on at least the received speed data, altitude data, and flight path data, including a second subset of the plurality of points for each boom footprint, and the permissible threshold boom value for each of the one or more locations, the second subset of the plurality of points being greater in number than the first subset of the plurality of points.

14. The system of claim 13, wherein the method further includes:

replacing the portion of the flight plan regenerated by the navigation system of the vehicle with a corresponding portion of the regenerated flight plan generated by the off-board control system.

15. The system of claim 9, wherein the second system is an auxiliary control system of the vehicle;

the generating the second adjustment to the at least one of the speed, the altitude, and the heading for the one or more locations along the flight path, is based on at least the received speed data, altitude data, and flight path data, including the first subset of the plurality of points for each boom footprint, and the permissible threshold boom value for each of the one or more locations; and the method further includes:

determining, using the one or more processors of the navigation system of the vehicle, whether the first adjusted speed, altitude, or heading of the portion of the flight plan regenerated by the one or more processors of the navigation system of the vehicle is within a predetermined speed range, a predetermined altitude range, or a predetermined heading range, respectively of the second adjusted speed, altitude, or heading of the portion of the flight plan regenerated by the one or more processors of the auxiliary control system.

16. The system of claim 15, wherein the method further includes replacing, upon determining that the first adjusted speed, altitude, or heading of the portion of the flight plan regenerated by the one or more processors of the navigation system is not within the predetermined speed range, the predetermined altitude range, or the predetermined heading range, respectively, the portion of the flight plan regenerated by the one or more processors of the navigation system of the vehicle with the portion of the flight plan regenerated by the auxiliary control system.

17. A non-transitory computer-readable medium storing instructions that, when executed by one or more processors, cause the one or more processors to perform a method of regenerating at least a portion of a flight plan of a vehicle, the method comprising:

receiving, by one or more processors of a first system, speed data, altitude data, and flight path data for a flight path of the vehicle, the first system comprising a navigation system of the vehicle, the flight path data including boom footprints for one or more locations along the flight path, each boom footprint including a plurality of points;

generating, using the one or more processors of the navigation system of the vehicle, a first adjustment to at least one of a speed, an altitude, and a heading for one or more locations along the flight path within at least one of a predetermined distance of the vehicle and a predetermined window of time, based on at least the received speed data, altitude data, and flight path data, including a first subset of the plurality of points of each boom footprint, and a permissible threshold boom value for each of the one or more locations;

regenerating, using the one or more processors of the navigation system of the vehicle, a portion of a flight plan corresponding to the one or more locations, based on the generated first adjustment to the at least one of the speed, the altitude, and the heading for the one or more locations;

generating, using one or more processors of a second system, a second adjustment to at least one of the speed, the altitude, and the heading for one or more locations along the flight path;

regenerating, using the one or more processors of the second system, a portion of the flight plan corresponding to the one or more locations, based on the generated second adjustment to the at least one of the speed, the altitude, and the heading for the one or more locations; and transmitting the regenerated flight plan generated by the second system to the navigation system of the vehicle as a command that controls the vehicle.

18. The computer-readable storage medium of claim 17, wherein the generating the first adjustment to the at least one of the speed, the altitude, and the heading for the one or more locations is further based on environment data specific to the one or more locations.

19. The computer-readable storage medium of claim 18, wherein the environment data specific to the one or more locations is received from one or more vehicles having passed through the one or more locations, respectively, within another predetermined window of time.

20. The computer-readable storage medium of claim 17, wherein the method further comprises:
  determining whether the generated first adjustment to the at least one of the speed, the altitude, and the heading for the one or more locations along the flight path is greater than a respective adjustment threshold; and
  requesting authorization for at least one of a change in speed, a change in altitude, and a change in heading of the vehicle from an operator of the vehicle upon determining that the generated first adjustment to the at least one of the speed, the altitude, and the heading for the one or more locations along the flight path is greater than a respective adjustment threshold.

* * * * *